US007015263B2

(12) United States Patent
Kumai et al.

(10) Patent No.: US 7,015,263 B2
(45) Date of Patent: Mar. 21, 2006

(54) PROCESS FOR RECOVERING FLUOROPOLYMERS

(75) Inventors: Seisaku Kumai, Kanagawa (JP); Yutaka Fukatsu, Kanagawa (JP); Ryota Tokura, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 689 days.

(21) Appl. No.: 10/091,315

(22) Filed: Mar. 6, 2002

(65) Prior Publication Data

US 2002/0128335 A1 Sep. 12, 2002

(30) Foreign Application Priority Data

Mar. 7, 2001 (JP) ............................ 2001-063503

(51) Int. Cl.
*C08J 11/04* (2006.01)
*C08F 6/16* (2006.01)

(52) U.S. Cl. ........................................ 523/310; 521/46

(58) Field of Classification Search ................ 523/310; 521/46
See application file for complete search history.

(56) References Cited

U.S. PATENT DOCUMENTS 4,433,082 A 2/1984 Grot
4,585,801 A 4/1986 Burney, Jr. et al.
6,515,102 B1 2/2003 Kumai et al.

FOREIGN PATENT DOCUMENTS

| | | | |
|---|---|---|---|
| JP | 03-014860 | | 2/1991 |
| JP | 11-288732 | | 10/1999 |
| JP | 10-258621 | * | 3/2000 |
| JP | 2000-86809 | | 3/2000 |

OTHER PUBLICATIONS

Patent Abstracts of Japan, JP 2000 086809, Mar. 28, 2000.

* cited by examiner

*Primary Examiner*—Edward J. Cain

(74) *Attorney, Agent, or Firm*—Oblon, Spivak, McClelland, Maier & Neustadt, P.C.

(57) ABSTRACT

A process for recovering fluoropolymers, which comprises contacting an ion exchange membrane comprising a fluoropolymer having carboxylic acid groups (hereinafter referred to as a C-polymer) and a fluoropolymer having sulfonic acid groups (hereinafter referred to as a S-polymer) and having inorganic particles deposited on the surface, with a solvent to let it swell and to remove the inorganic particles from the surface, then, contacting it with a solvent which is a good solvent for the S-polymer and a poor solvent for the C-polymer to obtain a solid composed mainly of the C-polymer and a solution having the S-polymer dissolved therein, and recovering them by solid-liquid separation.

18 Claims, No Drawings

PROCESS FOR RECOVERING FLUOROPOLYMERS

The present invention relates to a process for recovering fluoropolymers from fluorine-containing ion exchange membranes used for e.g. electrolysis of sodium chloride.

Fluorine-containing ion exchange membranes are widely used as diaphragms for electrolytic cells for the production of sodium hydroxide by electrolysis of sodium chloride. As such a fluorine-containing ion exchange membrane, a laminated ion exchange membrane having from 2 to 4 laminated films of a fluoropolymer having carboxylic acid groups and a fluoropolymer having sulfonic acid groups, or one having such a laminated ion exchange membrane reinforced by a woven fabric made of polytetrafluoroethylene (hereinafter referred to as PTFE).

Further, for the purpose of preventing deposition, on the membrane surface, of a gas generated during electrolysis and reducing the voltage for electrolysis, one having inorganic particles of e.g. silicon carbide or zirconium oxide coated on the surface of a laminated ion exchange membrane, is used. On the other hand, on the surface of the ion exchange membrane, precipitates composed mainly of iron oxide or a hydrate thereof (hereinafter referred to as surface precipitates) are likely to deposit during the electrolysis.

Heretofore, when the performance of ion exchange membranes used for the electrolysis decreased, it was common that they were dismounted from the electrolytic cell and used or disposed for e.g. land filling as wastes. However, in recent years, it is desired to recover and reuse fluoropolymers constituting the ion exchange membranes as materials for ion exchange membranes or membranes for fuel cells, from the viewpoint of avoiding the influence over the environment.

In order to recover and reuse a fluoropolymer having carboxylic acid groups and a fluoropolymer having sulfonic acid groups from ion exchange membranes, it is necessary not only to separate the two but also to remove the above-mentioned woven fabric and inorganic particles from the ion exchange membranes.

The following methods are known as a method for recovering fluoropolymers from fluorine-containing ion exchange membranes. A method wherein laminated fluorine-containing ion exchange membranes comprising two or more fluoropolymer layers having e.g. carboxylic acid groups and/or sulfonic acid groups, are converted to acid-forms or alkali metal salt-forms and then immersed in a water-soluble organic solvent to elute the respective fluoropolymers, and the respective fluoropolymers are recovered from the eluted solution (JP-B-3-14860), or a method wherein laminated ion exchange membranes comprising a fluoropolymer having carboxylic acid groups and a fluoropolymer having sulfonic acid groups, are immersed in a fluoroalcohol to elute the fluoropolymer having sulfonic acid groups (JP-A-2000-86809).

However, in these methods, after dissolving the fluoropolymers, inorganic particles are removed by filtration, but since the inorganic particles are fine particles, their removal is difficult, whereby there will be a problem that the obtainable fluoropolymers are of low purity and can hardly be reused, or a large amount of a solvent is required to dissolve the entire amount of the fluoropolymers.

It is an object of the present invention to provide a process for efficiently recovering a fluoropolymer having carboxylic acid groups and a fluoropolymer having sulfonic acid groups, respectively, in high purity, by removing inorganic particles from an ion exchange membrane comprising the fluoropolymer having carboxylic acid groups, the fluoropolymer having sulfonic acid groups and the inorganic particles deposited on the surface.

The present invention provides a process for recovering fluoropolymers, which comprises contacting an ion exchange membrane comprising a fluoropolymer having carboxylic acid groups (hereinafter referred to as a C-polymer) and a fluoropolymer having sulfonic acid groups (hereinafter referred to as a S-polymer) and having inorganic particles deposited on the surface, with a solvent to let it swell and to remove the inorganic particles from the surface, then, contacting it with a solvent which is a good solvent for the S-polymer and a poor solvent for the C-polymer to obtain a solid composed mainly of the C-polymer and a solution having the S-polymer dissolved therein, and recovering them by solid-liquid separation.

Here, the inorganic particles include not only particles of e.g. silicon carbide or zirconium oxide deposited on the surface of the ion exchange membrane to prevent attachment of gas, but also precipitates, etc. on the surface. Further, in this specification, the C-polymer includes not only one in the form of an acid-form but also one wherein a part or whole of the fluoropolymer having carboxylic acid groups is in the form of a salt-form. Likewise, the S-polymer includes not only one in the form of an acid-form but also one in which a part or whole of the fluoropolymer having sulfonic acid groups is in the form of a salt-form.

According to the present invention, an ion exchange membrane is swelled with a solvent, so that inorganic particles deposited on the surface of the ion exchange membrane will be separated and removed, and then the C-polymer and the S-polymer are recovered, whereby these polymers can be obtained in high purity.

The following methods may be mentioned as methods for separating inorganic particles from the swelled ion exchange membrane.

1) The ion exchange membrane is fixed. Then, the solvent is continuously supplied and contacted with the ion exchange membrane by a method such as refluxing under heating or circulation by pumping. As the ion exchange membrane swells, the inorganic particles will be separated from the ion exchange membrane and dispersed in the solvent. For the purpose of accelerating the separation of the inorganic particles, the ion exchange membrane may be shaked when the solvent is contacted with the ion exchange membrane.

2) The ion exchange membrane is cut into a proper size, preferably from 1 to 30 square cm, and put into the solvent, followed by stirring. The stirring time is preferably at least 5 hours, particularly preferably at least 20 hours. As the ion exchange membrane swells, the inorganic particles will be separated from the ion exchange membrane and dispersed in the solvent. At that time, it is preferred to heat the solvent for the purpose of accelerating the swelling. Then, the inorganic particles will be removed by a method wherein sieving is carried out so that the ion exchange membrane will remain on the sieve and thus will be separated from the solvent having the inorganic particles dispersed therein, or a method wherein the inorganic particles in the solvent will be precipitated and removed, and then the ion exchange membrane will be withdrawn.

In the present invention, the solvent to let the ion exchange membrane swell, is preferably one in which the solubility of the C-polymer and S-polymer is low. Specifically, a mixed solvent comprising a water-soluble organic solvent and water, is preferred. As a preferred water-soluble organic solvent, methanol, ethanol, n-propanol, i-propanol, dioxane, acetone, sulfolane, an ethylene glycol or a propylene glycol may be mentioned. Among them, from the viewpoint of efficiency in recovery and reuse of the solvent, methanol, ethanol, n-propanol, i-propanol or acetone is particularly preferred, and especially from the viewpoint of the handling efficiency, methanol or ethanol is preferred.

The content of water in the mixed solvent comprising a water-soluble organic solvent and water, varies depending upon the type and temperature of the water-soluble organic solvent, but is preferably at least 50 mass %, particularly preferably from 80 to 95 mass %. Further, an especially preferred mixed solvent of an organic solvent and water, is a mixed solvent of ethanol and water, wherein the content of water is from 60 to 98 mass %.

The temperature to let the ion exchange membrane swell, varies depending upon e.g. the solvent, but it is usually from 0 to 100° C., particularly preferably from 15 to 50° C. If the temperature is too high, the amounts of the C-polymer and the S-polymer dissolved in the solvent increase, whereby the recovery rates of the C-polymer and the S-polymer will decrease. The pressure to let the ion exchange membrane swell, may be normal pressure or elevated pressure.

In an ion exchange membrane after being used for electrolysis of sodium chloride, the fluoropolymers are mostly in the form of a sodium salt, irrespective of they are ones having carboxylic acid groups or ones having sulfonic acid groups. Accordingly, in the present invention, for the purpose of efficiently separating the C-polymer and the S-polymer in the subsequent step, it is preferred to add an acid to convert the C-polymer and the S-polymer from the salt-form to the acid-form, at the time of letting the ion exchange membrane swell.

As the acid to be used for this purpose, hydrochloric acid, sulfuric acid, phosphoric acid, nitric acid or acetic acid is, for example, preferred. Particularly preferred is hydrochloric acid. Further, in order to neutralize most of the salt, it is preferred that the amount of the acid is at least 1 equivalent to the total of the salt type ion exchange groups in the C-polymer and the salt type ion exchange groups in the S-polymer. On the other hand, the amount of the acid is preferably at most 10 equivalents, to the total of the above salt type ion exchange groups. Further, a preferred concentration of the acid to be used, is from 0.5 to 20 mass %, although it may vary depending upon the type of the acid.

In the present invention, the swelled ion exchange membrane is contacted with a solvent (hereinafter referred to as a separating solvent) which is a good solvent for the S-polymer and a poor solvent for the C-polymer, to separate and recover a solid composed mainly of the C-polymer and a solution having the S-polymer dissolved therein.

The separating solvent is preferably one in which the solubility of the S-polymer is at least 10 times, particularly preferably at least 30 times, the solubility of the C-polymer. Specifically, it is preferably ethanol, methanol, an aqueous ethanol solution having a content of water of at most 40 mass %, or an aqueous methanol solution having a content of water of at most 40 mass %, particularly preferably ethanol. Further, the solubility may be adjusted not only by selecting the type of the separating solvent, but also by controlling the temperature or the pressure.

The process for recovering the fluoropolymers of the present invention is suitable for recovering the C-polymer and the S-polymer from an ion exchange membrane for electrolysis of sodium chloride, containing the C-polymer and the S-polymer.

The C-polymer for an ion exchange membrane for electrolysis of sodium chloride may be an ion exchange membrane made of a copolymer of tetrafluoroethylene and perfluorovinyl ether having a carboxylic acid group and having an ion exchange capacity of from 0.8 to 1.9 meq/g dry resin. The above copolymer is preferably one obtained by hydrolyzing a precursor which is a copolymer of tetrafluoroethylene with perfluorovinyl ether having a carboxylate group. Here, the perfluorovinyl ether having a carboxylate group is preferably one represented by the formula $CF_2{=}CF{-}(OCF_2CFX)_p{-}(O)_q{-}(CF_2)_r{-}CO_2CH_3$, wherein p=0 to 3, q is 0 or 1, provided p+q≧1, r is 0 to 12, and X is —F or —$CF_3$. Particularly preferred are the following:

$CF_2{=}CFOCF_2CF_2CO_2CH_3$, $CF_2{=}CFOCF_2CF_2CF_2CO_2CH_3$, $CF_2{=}CFOCF_2CF(CF_3)OCF_2CF_2CO_2CH_3$.

Further, as the precursor, a three component type copolymer is also preferred which is obtained by polymerizing the following perfluorovinyl ether together with tetrafluoroethylene and perfluorovinyl ether having a carboxylate group.

$CF_2{=}CFOCF_2CF_2CF_3$, $CF_2{=}CFOCF_2CF(CF_3)OCF_2CF_2CF_3$.

Further, the S-polymer for the above ion exchange membrane for electrolysis of sodium chloride may be an ion exchange membrane made of a copolymer of tetrafluoroethylene with perfluorovinyl ether having a sulfonic acid group, and having an ion exchange capacity of from 0.8 to 1.3 meq/g dry resin. The above copolymer is preferably one obtained by hydrolyzing a precursor which is a copolymer of tetrafluoroethylene and perfluorovinyl ether having a sulfonyl fluoride group in its side chain. Here, the perfluorovinyl ether having a sulfonyl fluoride group is preferably one represented by the formula $CF_2{=}CF{-}(OCF_2CFZ)_s{-}(O)_t{-}(CF_2)_u{-}SO_2F$ wherein s=0 to 3, t is 0 or 1, provided s+t≧1, u is 0 to 12, and Z is —F or —$CF_3$. Particularly preferred are the following.

$CF_2{=}CFOCF_2CF_2SO_2F$, $CF_2{=}CFOCF_2CF(CF_3)OCF_2CF_2SO_2F$.

Further, in the present invention, when the ion exchange membrane is laminated with a reinforcing material such as a woven fabric made of PTFE, the reinforcing material may be removed at the time of removing the inorganic particles, or may be removed by providing a separate removal step.

According to the present invention, each of the C-polymer and the S-polymer can be recovered in a purity of at least 90 mass %, preferably at least 95 mass %. Since the C-polymer and the S-polymer can be recovered in high purity, respectively, it is possible to reuse them without purification after the recovery. However, if a higher purity is required depending upon the particular purpose, purification is carried out. As a purification method, preferred is a method wherein each of the C-polymer and the S-polymer is subjected to heat treatment in an alcohol such as methanol in the presence of sulfuric acid, and the resulting ester of the C-polymer or the like is removed.

The C-polymer recovered by the present invention, can be reused as a material for an ion exchange membrane for electrolysis of sodium chloride, or as a membrane material for a fuel cell. The S-polymer is useful as a membrane material for a fuel cell, as a material for an ion exchange membrane for electrolysis of sodium chloride or as a material for fluororesin fibers. Each polymer recovered by the present invention has a low content of inorganic particles and is particularly suitable for an application as an electronic material, such as a membrane material for a fuel cell.

A specific example of the process for recovering fluoropolymers of the present invention will be as follows.

An ion exchange membrane containing inorganic particles and an woven fabric of PTFE is cut and then contacted with an acid solution e.g. a mixed solution of a 10 mass % hydrochloric acid aqueous solution and ethanol (volume ratio: 10 mass % hydrochloric acid aqueous solution/ethanol=90%/10%). Then, filtration is carried out by means of a sieve, and the obtained filtered product is washed with a washing liquid such as water to remove the inorganic particles (the filtered product is the polymer components, and the inorganic particles are dispersed in the filtrate). The filtered product is contacted with a separating solvent such as ethanol to separate a solid containing the C-polymer as the main component and a solution having the S-polymer dissolved therein. The solid containing the C-polymer as the main component is dissolved in a solvent such as methanol, followed by filtration to separate and remove the woven fabric of PTFE.

Now, the present invention will be described with reference to Examples of the present invention (Examples 1 to 3) and Comparative Example (Example 4).

EXAMPLE 1

As an ion exchange membrane, an ion exchange membrane comprising a membrane of the C-polymer, a membrane of the S-polymer and a woven fabric of PTFE, laminated one on another and having inorganic particles deposited on the surface, which was used for electrolysis of sodium chloride, was prepared. The C-polymer was a sodium salt of a copolymer of tetrafluoroethylene with perfluorovinyl ether having a carboxylic acid group and had an ion exchange capacity of 1.8 meq/g dry resin. The S-polymer was a sodium salt of a copolymer of tetrafluoroethylene with perfluorovinyl ether having a sulfonic acid group and had an ion exchange capacity of 1.1 meq/g dry resin.

Into a 500 ml flask equipped with a condenser and a stirrer, 180 g of a 10 mass % hydrochloric acid aqueous solution and 20 g of ethanol were introduced, and 9.03 g of the above ion exchange membrane cut into 2 square cm (C-polymer: 7.50 g, S-polymer: 0.86 g, woven fabric: 0.54 g, silicon carbide: 0.03 g, zirconium oxide: 0.04 g, surface precipitates (calculated as iron element): 0.06 g) was added. After stirring at 20° C. for 15 hours, filtration was carried out with a 10 mesh sieve (manufactured by Iuchi Seieidou, the same applies hereinafter). The obtained solid filtration product and 200 g of water were put into a 500 ml flask and stirred at 20° C. for 30 minutes, followed by filtration with a 10 mesh sieve. This operation of mixing and stirring the filtration product and water, followed by filtration, was repeated three times to remove inorganic particles.

The filtration product having inorganic particles removed and 200 g of ethanol were put into a 500 ml flask and refluxed at 60° C. for 15 hours, followed by filtration with a 10 mesh sieve, whereby the C-polymer and the woven fabric of PTFE were taken as the filtration product, and the ethanol solution having the S-polymer dissolved therein was taken as the filtrate. Here, the solubility of the S-polymer in ethanol at 60° C. was 50 times the solubility of the C-polymer in said ethanol.

Then, the obtained filtrate was subjected to centrifugal separation at 4,000 rpm for 30 minutes, whereupon the supernatant was subjected to filtration with a filter paper having openings of 0.3 μm (manufactured by Toyo Roshi, the same applies hereinafter), and then ethanol was distilled off to obtain a colorless transparent acid-form S-polymer in a yield of 69.5%.

Further, the filtration product containing the C-polymer and the woven fabric of PTFE, and 200 g of methanol, were put into a flask and refluxed at 60° C. for 15 hours, followed by filtration with a 10 mesh sieve to remove the woven fabric of PTFE. Then, the filtrate was subjected to centrifugal separation at 4,000 rpm for 30 minutes, and the supernatant was subjected to filtration with a filter paper having openings of 0.3 μm, and then, methanol was distilled off to obtain a colorless transparent acid-form C-polymer in a yield of 87.4%.

With respect to each of the obtained C-polymer and S-polymer, the contents of silicon carbide, zirconium carbide and the surface precipitates (calculated as an iron element) were measured by ICP (high frequency inductively coupled plasma emission spectrometry) and found to be at most 10 ppm in all cases. Further, the purity of polymers was measured by $^{19}F$—NMR (superconductive nuclear magnetic resonance spectrometry), whereby the purity of the C-polymer was 95%, and the purity of the S-polymer was 95%.

Further, the C-polymer was further purified as follows. Into a 50 ml flask equipped with a condenser and a stirrer, 0.4 g of the obtained C-polymer, 19.6 g of methanol and 0.02 g of concentrated sulfuric acid were charged and refluxed with stirring at about 58° C. for 6 hours. After cooling, filtration was carried out with a membrane filter having openings of 3 μm, whereupon the C-polymer obtained as the filtration product, was analyzed by $^{19}F$—NMR, whereby the purity was 99%.

Further, the S-polymer was further purified as follows. Into a 50 ml flask equipped with a condenser and a stirrer, 0.4 g of the obtained S-polymer, 19.6 g of methanol and 0.02 g of concentrated sulfuric acid were charged and refluxed with stirring at about 58° C. for 6 hours. After cooling, filtration was carried out with a membrane filter having openings of 3 μm, whereupon a methanol solution of the S-polymer obtained as the filtration, was analyzed by $^{19}F$—NMR, whereby the purity was 99%.

EXAMPLE 2

Inorganic particles were removed from an ion exchange membrane in the same manner as in Example 1 except that water was used instead of the 10 mass % hydrochloric acid aqueous solution. Then, in the same manner as in Example 1, a colorless transparent sodium salt-form S-polymer was obtained in a yield of 57.4%, and a colorless transparent sodium salt-form C-polymer was obtained in a yield of 76.4%. With respect to each of the obtained S-polymer and C-polymer, the contents of silicon carbide, zirconium oxide and surface precipitates (calculated as an iron element) were measured by ICP and found to be at most 10 ppm in all cases. Further, the purity was measured by $^{19}F$—NMR, whereby the purity of the S-polymer was 90%, and the purity of the C-polymer was 95%.

EXAMPLE 3

A colorless transparent sodium salt-type S-polymer was obtained in a yield of 76.5%, and a colorless transparent sodium salt-type C-polymer was obtained in a yield of 53.4%, in the same manner as in Example 2 except that 9.34 g of the following membrane was used as the ion exchange membrane.

The ion exchange membrane used was an ion exchange membrane comprising 2.20 g of a membrane of the C-polymer, 4.40 g of a membrane of the S-polymer (S-polymer a), 1.89 g of a membrane of another S-polymer (S-polymer b) and 0.58 g of a woven fabric of PTFE, laminated one on another and containing inorganic particles (0.14 g of zirconium oxide and 0.13 g of surface precipitates (calculated as an iron element)), which was used for electrolysis of sodium chloride.

The C-polymer was a sodium salt of a copolymer of tetrafluoroethylene and perfluorovinyl ether having a carboxylic acid group and having an ion exchange capacity of 1.0 meq/g dry resin. The S-polymer a is a sodium salt of a copolymer of tetrafluoroethylene with perfluorovinyl ether having a sulfonic acid group and having an ion exchange capacity of 1.1 meq/g dry resin, and the S-polymer b is a sodium salt of a copolymer of tetrafluoroethylene with perfluorovinyl ether having a sulfonic acid group and having an ion exchange capacity of 1.0 meq/g dry resin.

With respect to each of the obtained S-polymer and C-polymer, the contents of zirconium oxide and surface precipitates (calculated as an iron element) were measured by ICP and found to be at most 10 ppm in all cases. Further, the purity of polymers was measured by $^{19}$F—NMR, whereby the purity of the S-polymer was 94%, and the purity of the C-polymer was 90%.

EXAMPLE 4

Using the same ion exchange membrane as used in Example 3, inorganic particles were removed from the ion exchange membrane in the same manner as in Example 3. After adding 200 g of methanol thereto, refluxing was carried out at 60° C. for 15 hours, followed by filtration with a 10 mesh sieve, to obtain the woven fabric of PTFE as the filtration product, and a mixed solution of the C-polymer and the S-polymer as the filtrate. This filtrate was subjected to centrifugal separation at 4,000 rpm for 30 minutes, and the supernatant was subjected to filtration with a filter paper having openings of 0.3 $\mu$m, and then methanol was distilled off to obtain a mixture of the C-polymer and the S-polymer as solid. This mixture and 200 g of ethanol were put into a flask and refluxed at 60° C. for 15 hours, followed by filtration with a filter paper having openings of 0.3 $\mu$m, to obtain a sodium salt type C-polymer as the filtration product in a yield of 51.1%. Further, ethanol in the filtrate was distilled off to obtain a sodium salt-form S-polymer in a yield of 71.3%.

With respect to each of the obtained S-polymer and C-polymer, the contents of zirconium oxide and surface precipitates (calculated as an iron element) were measured by ICP and found to be at most 10 ppm in all cases. Further, the purity of polymers was measured by $^{19}$F—NMR, whereby the purity of the S-polymer was 93%, and the purity of the C-polymer was 82%.

By the present invention, fluoropolymers in a used fluorine-containing ion exchange membrane can be recovered efficiently and simply. A recycling process can be established for the fluoropolymers, whereby it is possible to reduce wastes.

The entire disclosure of Japanese Patent Application No. 2001-63503 filed on Mar. 7, 2001 including specification, claims and summary are incorporated herein by reference in its entirety.

What is claimed is:

1. A process for recovering fluoropolymers, comprising: contacting an ion exchange membrane comprising a fluoropolymer having carboxylic acid groups (hereinafter referred to as a C-polymer), and a fluoropolymer having sulfonic acid groups (hereinafter referred to as a S-polymer), and having inorganic particles deposited on the surface, with a solvent to let said ion exchange membrane swell and to remove the inorganic particles from the surface, then, contacting said ion exchange membrane with a solvent which is a good solvent for the S-polymer and a poor solvent for the C-polymer to obtain a solid comprising mainly the C-polymer and a solution having the S-polymer dissolved therein, and recovering said C-polymer and said S-polymer by solid-liquid separation;

wherein the solvent to let the ion exchange membrane swell is a mixed solvent comprising a water-soluble organic solvent and water.

2. The process for recovering fluoropolymers according to claim 1, wherein the solvent which is a good solvent for the S-polymer and a poor solvent for the C-polymer, is such that the solubility of the S-polymer therein is at least 10 times the solubility of the C-polymer therein.

3. The process for recovering fluoropolymers according to claim 1, wherein before contacting with the solvent which is a good solvent for the S-polymer and a poor solvent for the C-polymer, the ion exchange membrane after removing the inorganic particles, is treated with an acid to convert the C-polymer and S-polymer from salt-form to acid-form.

4. The process for recovering fluoropolymers according to claim 1, wherein the C-polymer is a copolymer obtained by copolymerizing tetrafluoroethylene with a perfluoro vinyl ether having a carboxylic acid group and has an ion exchange capacity of from 0.8 to 1.9 meq/g dry resin.

5. The process for recovering fluoropolymers according to claim 1, wherein the content of water in the mixed solvent comprising a water-soluble organic solvent and water, is at least 50 mass %.

6. The process for recovering fluoropolymers according to claim 1, wherein the water-soluble organic solvent is methanol or ethanol.

7. The process for recovering fluoropolymers according to claim 1, wherein the mixed solvent comprising a water-soluble organic solvent and water, is an aqueous ethanol solution, wherein the content of water is from 60 to 98 mass %.

8. The process for recovering fluoropolymers according to claim 2, wherein the solvent which is a good solvent for the S-polymer and a poor solvent for the C-polymer, is ethanol, methanol, an aqueous ethanol solution having a content of water of at most 40 mass %, or an aqueous methanol solution having a content of water of at most 40 mass %.

9. The process for recovering fluoropolymers according to claim 1, wherein the solvent which is a good solvent for the S-polymer and a poor solvent for the C-polymer, is ethanol, methanol, an aqueous ethanol solution having a content of water of at most 40 mass %, or an aqueous methanol solution having a content of water of at most 40 mass %.

10. The process for recovering fluoropolymers according to claim 4, wherein the C-polymer is one obtained by hydrolyzing a copolymer of tetrafluoroethylene and $CF_2{=}CFOCF_2CF(CF_3)OCF_2CF_2CO_2CH_3$.

11. The process for recovering fluoropolymers according to claim 1, wherein the S-polymer is one obtained by hydrolyzing a copolymer of tetrafluoroethylene and $CF_2{=}CFOCF_2CF(CF_3)OCF_2CF_2SO_2F$.

12. The process for recovering fluoropolymers according to claim 1, wherein said inorganic particles comprise silicon carbide or zirconium oxide.

13. The process for recovering fluoropolymers according to claim 1, wherein said inorganic particles comprise at least one precipitate.

14. The process for recovering fluoropolymers according to claim 1, wherein said solvent for swelling the ion exchange membrane is selected from the group consisting of methanol, ethanol, n-propanol, i-propanol, dioxane, acetone, sulfolane, an ethylene glycol, a propylene glycol and mixtures thereof.

15. The process for recovering fluoropolymers according to claim 1, wherein said swelling occurs at a temperature of from 0 to 100° C.

16. The process for recovering fluoropolymers according to claim 1, wherein said swelling occurs at a temperature of from 15 to 50° C.

17. The process for recovering fluoropolymers according to claim 1, wherein each of the C-polymer and the S-polymer are recovered in a purity of at least 90 mass %.

18. The process for recovering fluoropolymers according to claim 1, wherein each of the C-polymer and the S-polymer are recovered in a purity of at least 95 mass %.

* * * * *